United States Patent
Schelhaas

(10) Patent No.: US 10,140,780 B2
(45) Date of Patent: Nov. 27, 2018

(54) EVENT-/CONDITION-BASED MACHINE MONITORING FOR QUALITY INSPECTIONS

(71) Applicant: SAP SE, Walldorf (DE)

(72) Inventor: Christian Schelhaas, Uetze (DE)

(73) Assignee: SAP SE, Walldorf (DE)

( * ) Notice: Subject to any disclaimer, the term of this patent is extended or adjusted under 35 U.S.C. 154(b) by 277 days.

(21) Appl. No.: 14/842,584

(22) Filed: Sep. 1, 2015

(65) Prior Publication Data
US 2017/0059453 A1    Mar. 2, 2017

(51) Int. Cl.
*G01M 99/00* (2011.01)
*G05B 19/048* (2006.01)
*G07C 5/00* (2006.01)

(52) U.S. Cl.
CPC .......... *G07C 5/00* (2013.01); *G01M 99/008* (2013.01); *G05B 19/048* (2013.01)

(58) Field of Classification Search
CPC .......... G01M 99/008; G06Q 10/06; G06Q 10/06395; G06Q 10/087; G05B 13/042
See application file for complete search history.

(56) References Cited

U.S. PATENT DOCUMENTS

2005/0095774 A1* 5/2005 Ushiku ............ G05B 19/4184
                                                      438/222
2015/0363793 A1* 12/2015 Lam ................. G06Q 30/0201
                                                      705/7.29

* cited by examiner

*Primary Examiner* — Changhyun Yi
(74) *Attorney, Agent, or Firm* — Fountainhead Law Group P.C.

(57) ABSTRACT

Embodiments implement event- and/or condition-based machine monitoring for quality inspection in a manufacturing process. An application receives from a machine, an input comprising event(s) and/or condition(s) potentially affecting product quality. Such an event could be scheduled/unscheduled maintenance of the machine. An exemplary condition could be deviation an operating parameter of the machine that is being monitored. Based upon this input, the engine references a ruleset to output a level of Quality Assurance (QA) product inspection with a changed component (for example, including a more stringent tolerance requirement, an additional inspection step, and/or inspection of larger/additional product lots). Embodiments thus automatically link a rigor of product inspection with changes in machine state having the potential to degrade product quality. The ruleset may be configured to automatically relax the changed quality level where follow-up data indicates that the event(s) and/or condition(s) not to have adversely affected product quality.

17 Claims, 6 Drawing Sheets

EVENT-/CONDITION-BASED MACHINE MONITORING FOR QUALITY INSPECTIONS

BACKGROUND

Unless otherwise indicated herein, the approaches described in this section are not prior art to the claims in this application and are not admitted to be prior art by inclusion in this section.

Embodiments relate to monitoring of machines utilized in manufacturing, and in particular to event- and/or condition-based monitoring for quality inspections.

Enterprise Resource Planning (ERP) software provides a user with the ability to collect, store, and analyze information relating to a manufacturing process. Quality Assurance (QA) in such a manufacturing process may be supported by an ERP functionality known as quality inspection.

Quality inspection is based on inspection lots of a product that is being manufactured. The inspection lot typically includes samples and inspection characteristics that can vary based upon user settings.

These settings determine a quality level for purposes of inspection. An increase in this quality level leads to a more thorough inspection of products produced by the machine. This elevated criteria for inspection may be reflected in various ways, for example the lot containing a larger quantity to inspect, the lot being subjected to more characteristics to measure, and/or the application of more stringent requirements for those characteristics that are measured.

Conventionally, the quality level is manually set by QA personnel based on events that occur. Such events may comprise detection of failures in already-produced products, and/or complaints from customers.

One source of quality problems can arise from deviations in machine conditions indicating a disruptive usage of the machine. Usually, a quality check of the machine is performed after an incident that requires service of the machine or planned/unplanned maintenance.

The ERP uses inspection lots to process calibration of the machine after a repair or service. Restarting a machine production process that has been interrupted by a disruption, however, requires monitoring not only the machine itself, but also a quality of the products subsequently produced.

In a typical ERP system, the function to establish the quality level is a manual process. The system user uses his or her discretion to determine if a change in quality level is appropriate for the output materials.

Conventionally, then, there exists no system-driven trigger to change the settings based on machine conditions or machine events. There may be no linkage between the occurrences of different events that can affect quality. Events such as service maintenance, machine repair, or deviation in machine conditions, are stored separately.

Also, there is no check regarding what products will be produced on a machine with an event or incident, and no automated increase of the quality level is implemented. Moreover, checking of machine conditions is not available for in-house production as well as data retrieval from a supplier.

SUMMARY

Embodiments implement event- and/or condition-based machine monitoring for quality inspection in a manufacturing process. An application (e.g., Enterprise Resource Management—ERM software) receives from a machine, an input comprising event(s) and/or condition(s) potentially affecting product quality. Such an event could be scheduled/unscheduled maintenance of the machine. An exemplary condition could be deviation of a monitored operating parameter of the machine. Based upon this input, the engine references a ruleset to output a level of Quality Assurance (QA) product inspection with a changed component (for example, including a more stringent tolerance requirement, requiring an additional inspection step, and/or calling for inspection of additional/larger product lots). Embodiments thus automatically link a rigor of product inspection with changes in machine state having the potential to degrade product quality. The ruleset may be configured to automatically relax the changed quality level where follow-up data indicates the event(s) and/or condition(s) to not have adversely affected quality of products produced by the machine.

An embodiment of a computer-implemented method comprises an engine receiving data detected from a machine, wherein the machine produces products evaluated by a first inspection quality level including a criterion, and the data comprises a condition or an event. The engine references a ruleset to assess the data and output a second inspection quality level including an updated criterion. The engine stores the second inspection quality level in a database.

A non-transitory computer readable storage medium embodies a computer program for performing a method comprising an engine receiving data detected from a machine. The machine produces products from a material, and the products are evaluated according to a first inspection quality level including a first criterion. The material is evaluated according to a second inspection quality level according to a second criterion, and the data comprises a condition or an event. The engine references a ruleset to assess the data and output, a third inspection quality level including an updated first criterion, and a fourth inspection quality level including an updated second criterion. The engine stores in a database, the third inspection quality level and the fourth inspection quality level.

An embodiment of a computer system comprises one or more processors and a software program, executable on said computer system. The software program is configured to cause an in-memory database engine to receive data detected from a machine, the machine producing products evaluated according to a first inspection quality level including a first criterion. The data comprises a condition or an event. The software program is configured to adopt a rule of a ruleset based upon past data collected from the machine. The software program is configured to reference the rule and a production plan to assess the data and output a second inspection quality level including an updated first criterion comprising a time, an increased inspection lot size, an additional inspection step, or a more stringent tolerance. The software program is configured to store the second inspection quality level in an in-memory database.

In some embodiments the event comprises downtime of the machine.

In certain embodiments the condition comprises an operational parameter.

According to particular embodiments the condition comprises a detected characteristic.

In various embodiments the criterion comprises a first tolerance, and the updated criterion comprises a second tolerance more stringent than the first tolerance.

In some embodiments the criterion comprises a first inspection lot size, and the updated criterion comprises a second inspection lot size larger than the first inspection lot size.

According to certain embodiments the updated criterion comprises a time.

In particular embodiments the engine is configured to further reference a production plan to output the second inspection quality level.

In various embodiments the database comprises an in-memory database, and the engine comprises an in-memory database engine.

The following detailed description and accompanying drawings provide a better understanding of the nature and advantages of embodiments.

DETAILED DESCRIPTION

Described herein are methods and apparatuses configured to perform machine monitory for quality inspection according to embodiments. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Embodiments implement event- and/or condition-based machine monitoring for quality inspection in a manufacturing process. An application (e.g., ERM software) receives from a machine, an input comprising event(s) and/or condition(s) potentially affecting product quality. Such an event could be scheduled/unscheduled maintenance of the machine. An exemplary condition could be deviation an operating parameter of the machine that is being monitored. Based upon this input, the engine references a ruleset to output a level of Quality Assurance (QA) product inspection with a changed component (for example, including a more stringent tolerance requirement, an additional inspection step, and/or inspection of additional product lots). Embodiments thus automatically link a rigor of product inspection with changes in machine state having the potential to degrade product quality. The ruleset may be configured to automatically relax the changed quality level where follow-up data indicates the event(s) and/or condition(s) to have not adversely affected quality of products produced by the machine.

Figure 1:
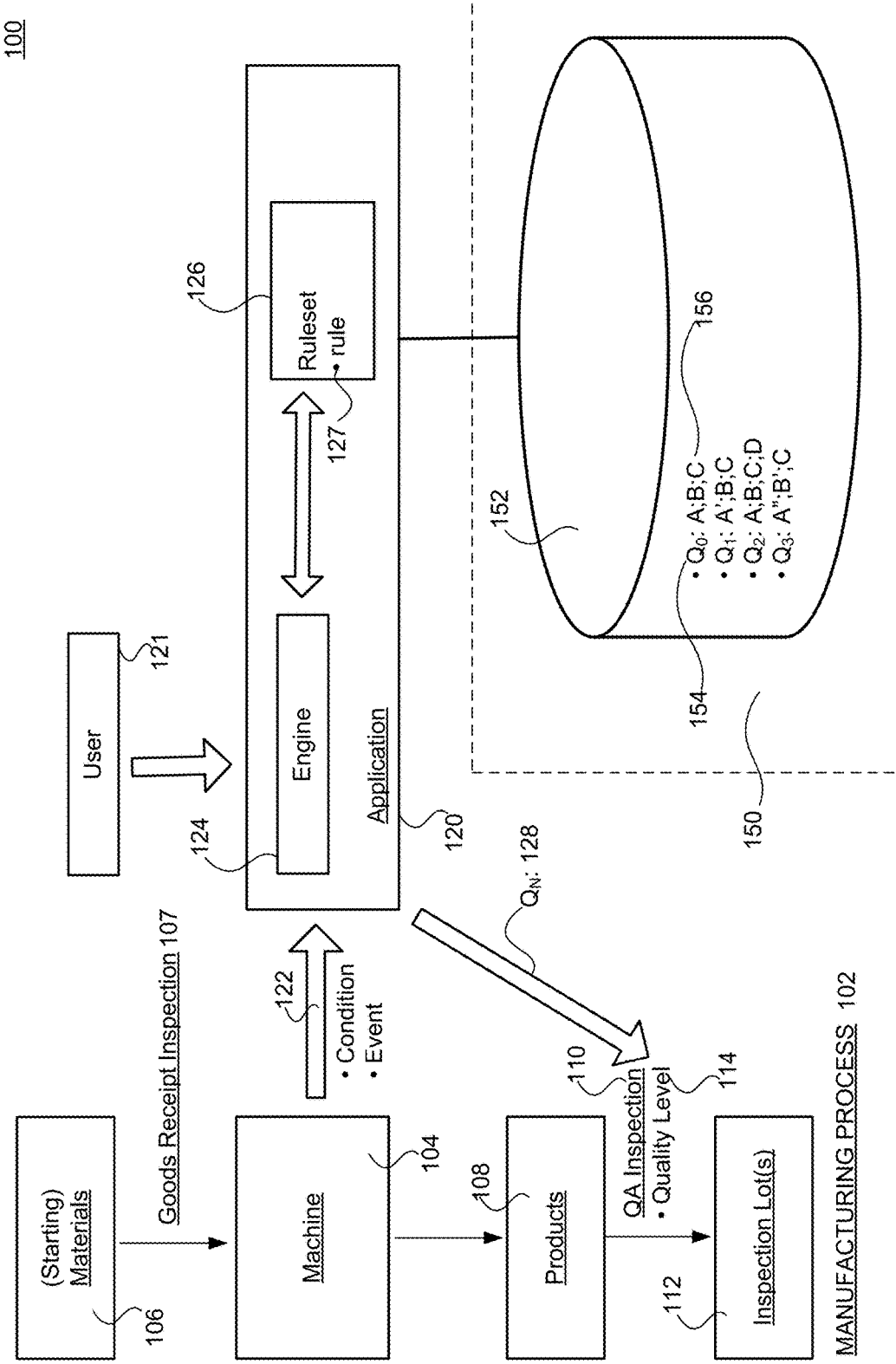
FIG. 1 shows a simplified view of a system according to an embodiment.

FIG. 1 presents a simplified view of a system 100 according to an embodiment. In particular, the left-hand side of FIG. 1 shows a generic manufacturing process 102 in which a machine 104 receives materials 106, and functions according to operational parameters to modifies same in order to produce a product 108.

Under some circumstances, the materials may be raw starting materials for the manufacturing process. In other circumstances, the materials may themselves be processed goods that have been produced by a supplier. Such goods may be subject of a goods receipt inspection 107 to determine their quality.

In order to assure the quality of the end products for their final use, a quality inspection process 110 is performed. Specifically, inspection lots 112 are selected for inspection according one or more criterion dictated by particular quality level 114.

For example, a level zero quality inspection ($Q_0$) may require the product lot to meet criteria A, B, and C. A level one quality inspection ($Q_1$) may require the product lot to further meet an enhanced criterion A'. A level two quality inspection ($Q_2$) may require the product lot to meet an additional criterion D.

It is recognized that changes in the circumstances of the machine may have impact the quality of the products produced thereafter. For example, a machine maintenance event (unscheduled or even scheduled), can thereafter have a deleterious effect upon the nature of the products produced.

Further, key operational parameters can reflect a health of the machine, and hence are typically monitored. Changes in one or more such machine operating parameters can comprise conditions having the potential to impact product quality.

Accordingly, FIG. 1 further shows an application 120 in communication with a user 121. The application is configured to receive input 122 in the form of such machine-based condition(s) and/or event(s). This application is in communication with an underlying data storage layer 150 which includes a data warehouse 152 (e.g., such as a database) comprising information relevant to the manufacturing process. Here, that information includes a plurality of various quality inspection levels 154 as well as criteria 156 associated therewith.

The data storage layer may include other information relevant to the machine, such as production plan(s). The data storage layer may be accessed by a variety of applications, such as ERM software.

Application 120 (which may comprise, e.g., ERM software) includes an engine 124 and a ruleset 126 comprising one or more rules 127. Based upon the event and/or condition information received from the machine, the engine references the ruleset to automatically output an inspection level 128 including a changed criterion.

It is noted that according to some embodiments, the mere passage of time could comprise an event or condition upon which a changed inspection level is based. For example, one specific rule of the ruleset could dictate an enhanced inspection level for a fixed period of time following a machine maintenance event, automatically reverting to a less stringent inspection level thereafter.

Figure 2:
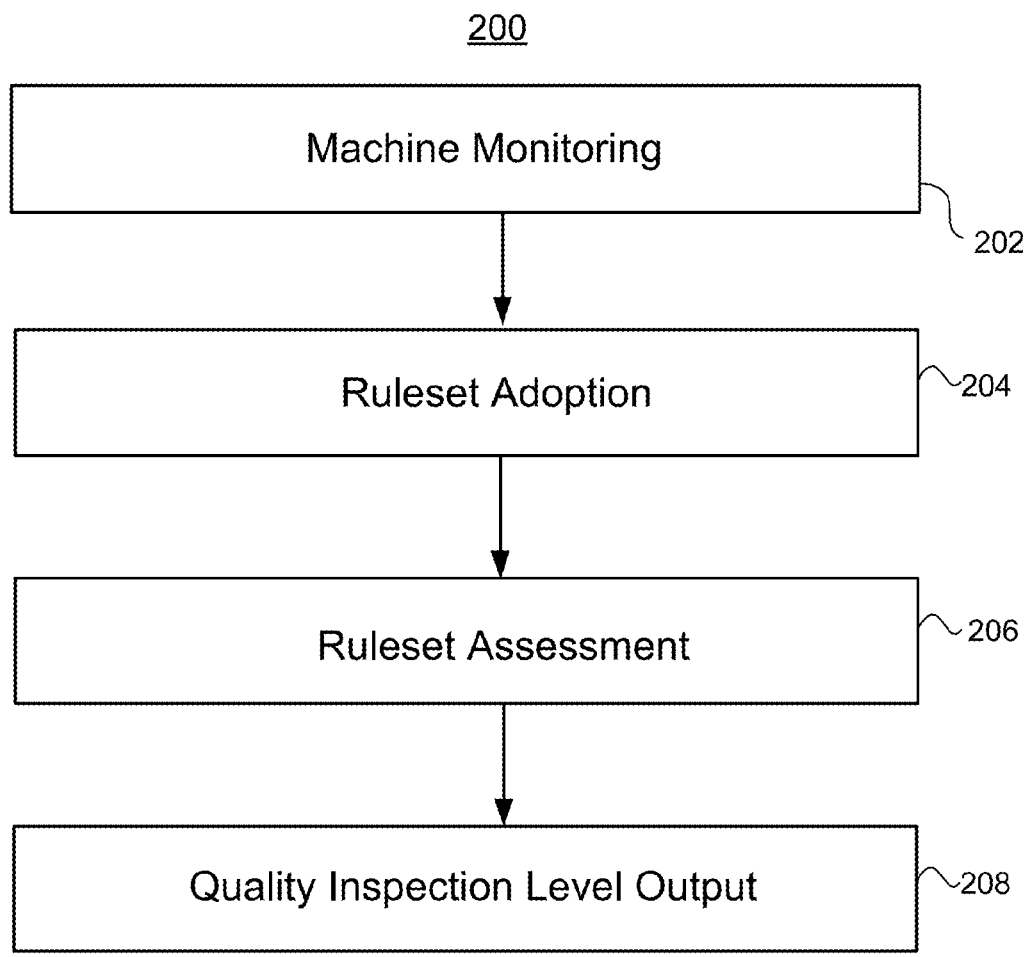
FIG. 2 shows a simplified process flow according to an embodiment.

FIG. 2 is a simplified flow diagram showing a method 200 according to an embodiment. In a first step 202, an engine receives an input in the form of a condition or an event relating to a machine. According to certain embodiments, the engine may be present in an application layer. In some embodiments, the engine may be present in a database layer underlying the application layer.

For a machine dedicated in a production environment, there may be a set of functions for surveillance. These can include direct machine data, such as planned and unplanned downtime, uptime, machine condition, and appearance.

Unplanned downtime indicates a failure where the machine might not be able to produce in good quality. Planned downtime indicates that maintenance occurred and the machine needs to be adjusted after a restart.

For downtime and uptime, status changes may be monitored, while machine characteristics like temperature, noise, dirt, vibrations, and/or others are detected. The data will be provided as input parameters for a ruleset decision, if the quality level of the output inspection is to be increased.

In a second step 204, a ruleset is adopted. Based on past data collection reflecting factors including but not limited to machine condition, failure rates, and complaints, statistical analysis may be used to determine input parameters indicating and/or forecasting a higher failure rate.

In a third step 206, based upon the input the engine references a rule of the ruleset. According to some embodiments, the rule/ruleset may be stored in the application layer. In some embodiments, the rule/ruleset may be stored in a database layer underlying the application layer.

The production plan indicates material(s) to be processed at the moment of condition measurement or in the near future. For these materials the ruleset assessment will be performed.

Based on past data, with reference to the ruleset the engine determines if the same conditions occurred previously, and a higher error rate of the output was a consequence or the number of complaints increased. The engine may also consider a manual user assessment that such conditions would lead to a higher failure rate regarding the output.

If the engine's ruleset assessment predicts a consequential higher error rate and/or an increase in the number of complaints, the quality inspection may be tightened. Inspection samples may include a higher percentage of material to be inspected, and further characteristics can be checked as compared to a normal inspection, where machine conditions do not indicate a deviation in operations.

Accordingly, in a fourth step 208 the engine outputs an inspection quality level including a changed criterion. This changed criterion can include additional inspection steps, further requirements to be met by inspection, and/or an increase in the stringency of the existing inspection requirements.

Further details regarding embodiments of machine monitoring according to various embodiments, are now provided in connection with the following example.

Example

One example of condition-/event-based machine monitoring according to embodiments is now described in connection with Enterprise Resource Planning (ERP) software available from SAP SE, of Walldorf, Germany.

In this example, the ERP software utilizes quality inspection lots to control the output of a production process. This is related to in-house production, and based on inspection lots during production. As described herein, a link between machine conditions and the quality level could impact the inspection process to increase or decrease required inspection steps and/or alter the evaluation process.

Conditions of the machine, and also changes in its status (e.g., scheduled maintenance, unscheduled maintenance, operational interruption/shut down) are monitored. A ruleset is used to determine if a condition and/or a status change in the machine warrants increasing the quality level or not.

Figure 3:
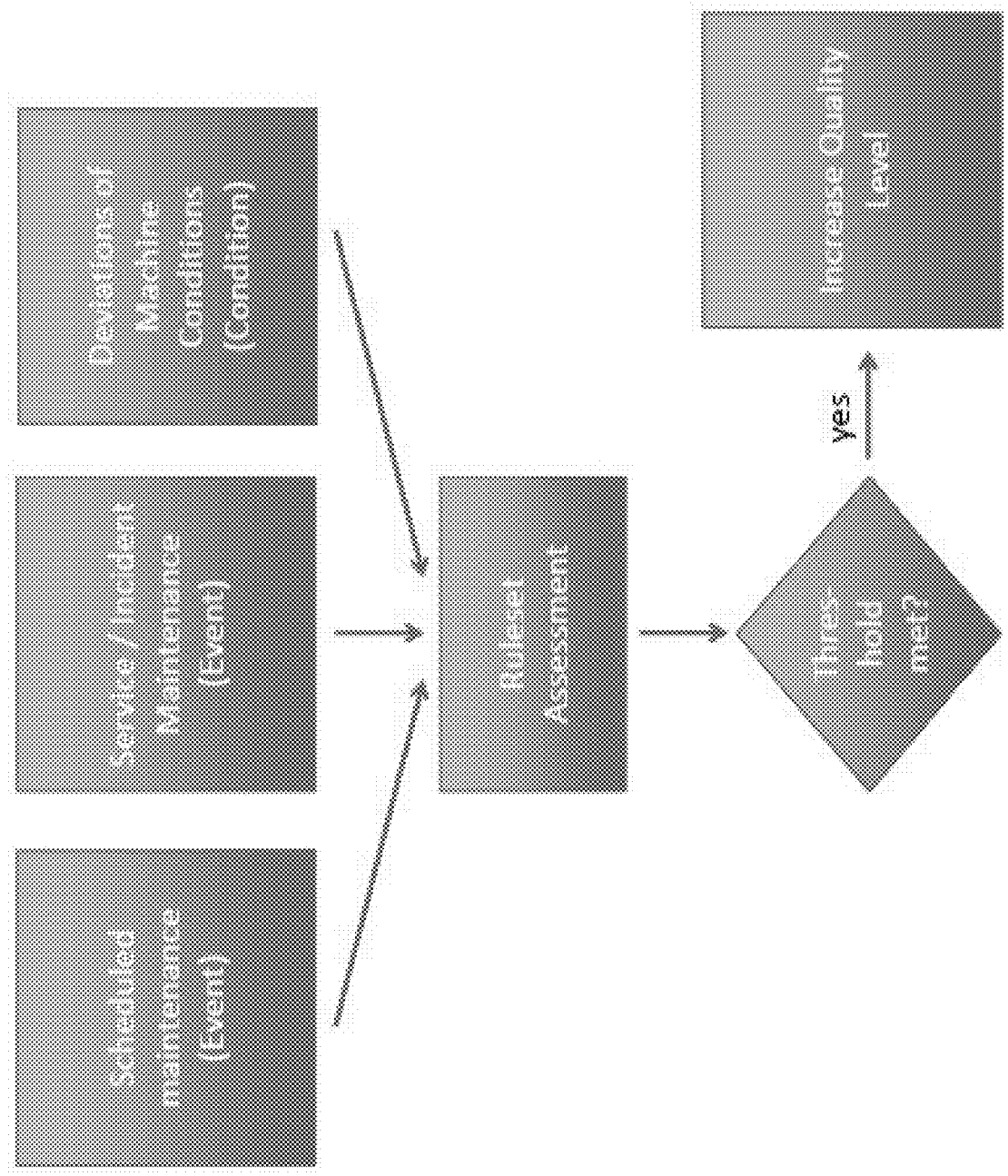
FIG. 3 is a simplified block diagram showing assessment of incoming conditions and events according to a ruleset.

FIG. 3 is a simplified block diagram showing the possible inputs to the ruleset that may result a changed quality inspection level. These inputs can include events in the form of scheduled maintenance of the machine, and/or machine incidents result in unscheduled machine maintenance. These inputs can also include conditions in the form of deviation of machine operating parameters from a desired value.

An assessment of these event(s) and/or condition(s) in light of a ruleset is performed. Where a threshold level is met, a quality level is increased.

In case that an increase is appropriate, the quality level may be changed for products that are manufactured by the machine. Such an increase in quality level leads to a more thorough inspection process of related output products.

According to embodiments, the ruleset may automatically lead to a change of the quality level for inspection lots for production control. This stands in contrast with conventional approaches lacking a ruleset to link machine conditions and/or events to a more exacting quality inspection of products to be produced.

It is noted that embodiments are not limited to performing quality inspections for inhouse production only. Manufacturers may obtain a large percentage of starting materials from other internal suppliers or external suppliers. The quality inspection process is handled at goods receipt of the procured material.

Where parts are manufactured by a supplier, the machine conditions and status changes can be monitored in a different system. However, conditions/status changes can be used to change the quality level of products in the goods receipt inspection.

Data transmission can provide data at the supplier location for indicators that a more detailed inspection process is required. A ruleset can determine if an automatic change is necessary for inspection lots at the goods receipt.

For inhouse and supplier production, one or more of the following can for the basis of an assessment by the ruleset regarding a level of quality inspection:
  machine repair based on incident like breakdown (event);
  machine maintenance or planned service (event);
  deviation(s) of machine values (conditions).

The monitoring of machine conditions and events according to embodiments, can lead to a prediction of output quality, and hence support the inspection process.

Figure 4:
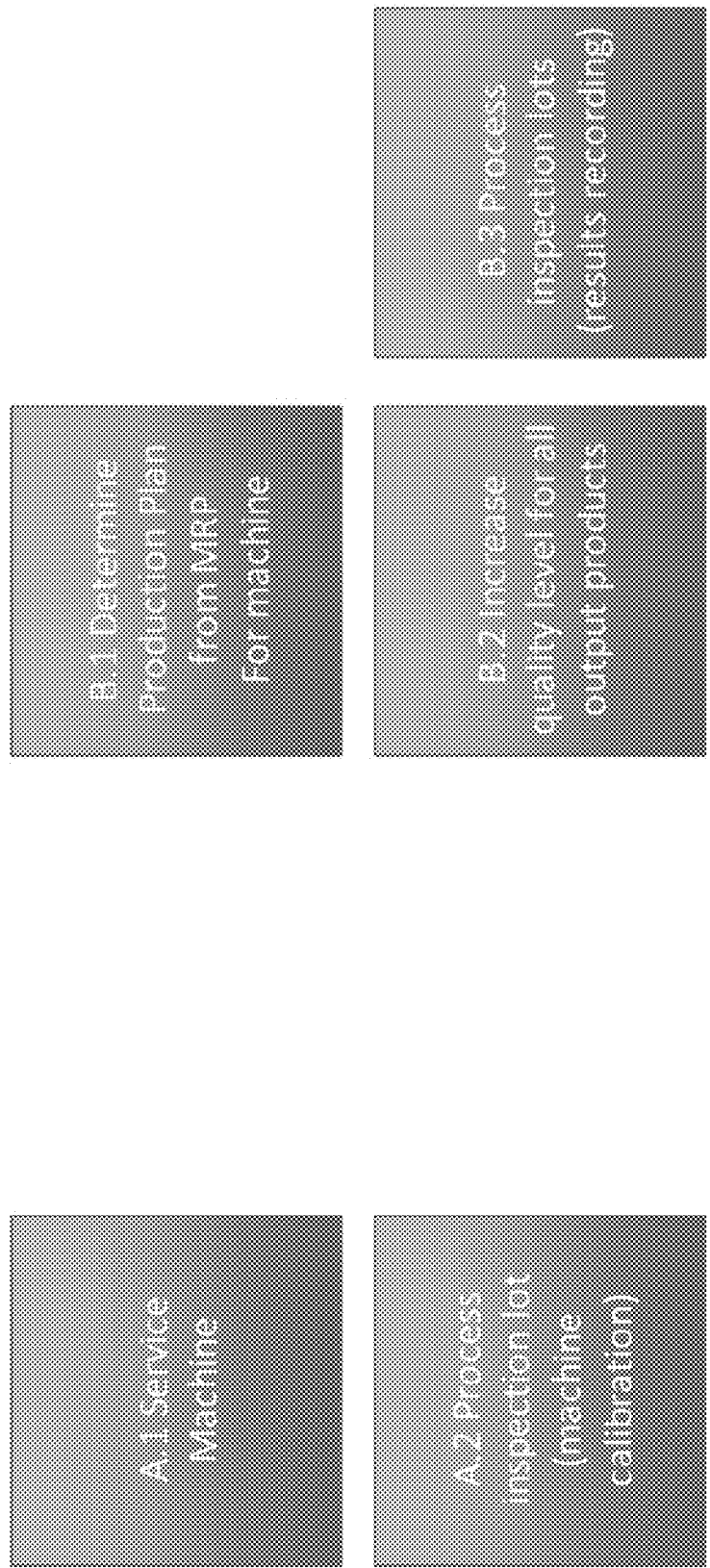
FIG. 4 shows various steps according to an embodiment.

FIG. 4 is a simplified block diagram showing steps according to the example. Here, following a machine service in step A.1, the inspection lot is processed for calibration purposes in step A.2. Additional steps may B.1-B.3 may determine a production plan from a Materials Resource Planning (MRP) application, increase a quality level, and process inspection lots for recordation of results.

Figure 5:
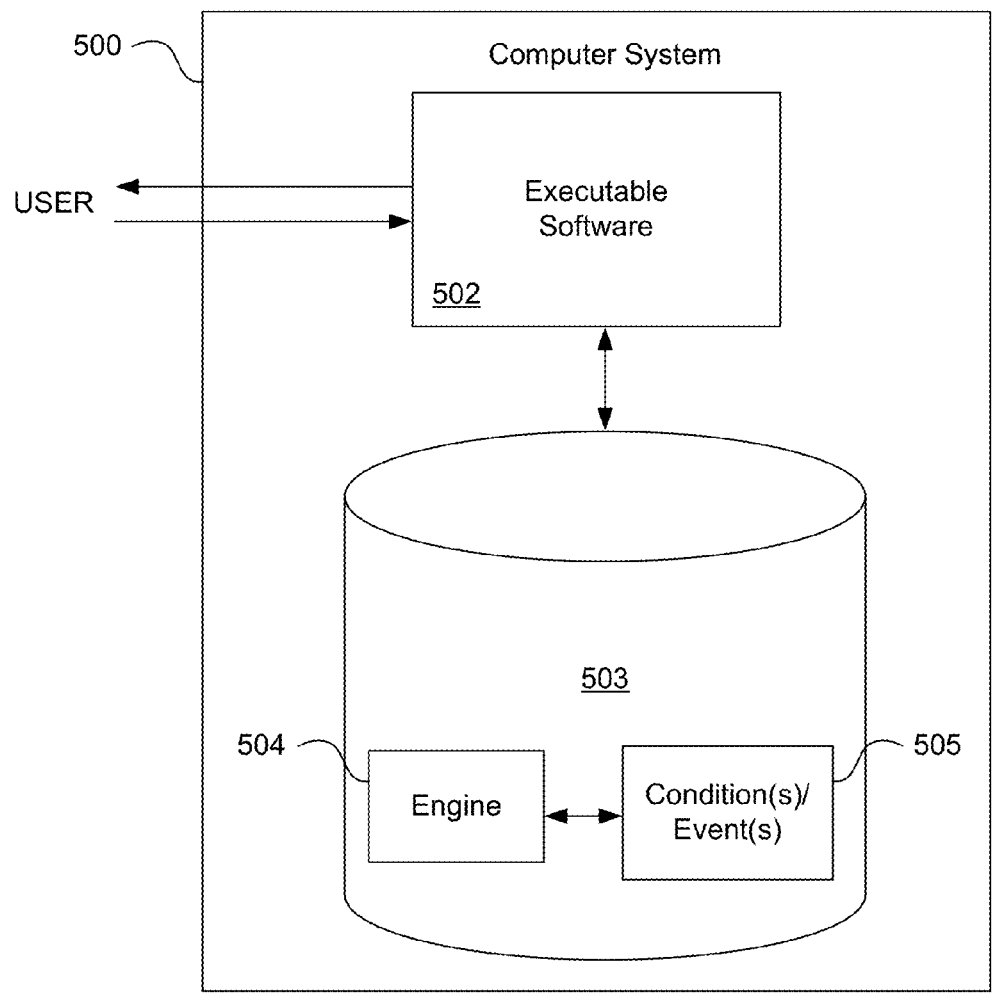
FIG. 5 illustrates hardware of a special purpose computing machine configured to perform machine monitoring for quality inspection according to embodiments.

FIG. 5 illustrates hardware of a special purpose computing machine configured to perform machine monitoring for quality inspections according to an embodiment. In particular, computer system 500 comprises a processor 502 that is in electronic communication with a non-transitory computer-readable storage medium 503. This computer-readable storage medium has stored thereon code 505 corresponding to machine event(s) and/or condition(s). Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of the database. Such an embodiment can correspond to applications performing processing by a powerful engine available as part of an in-memory database (e.g., the HANA in-memory database available from SAP SE of Walldorf, Germany). However this is not required and in certain embodiments the engine may be implemented in other ways, for example as part of an overlying application layer.

Figure 6:
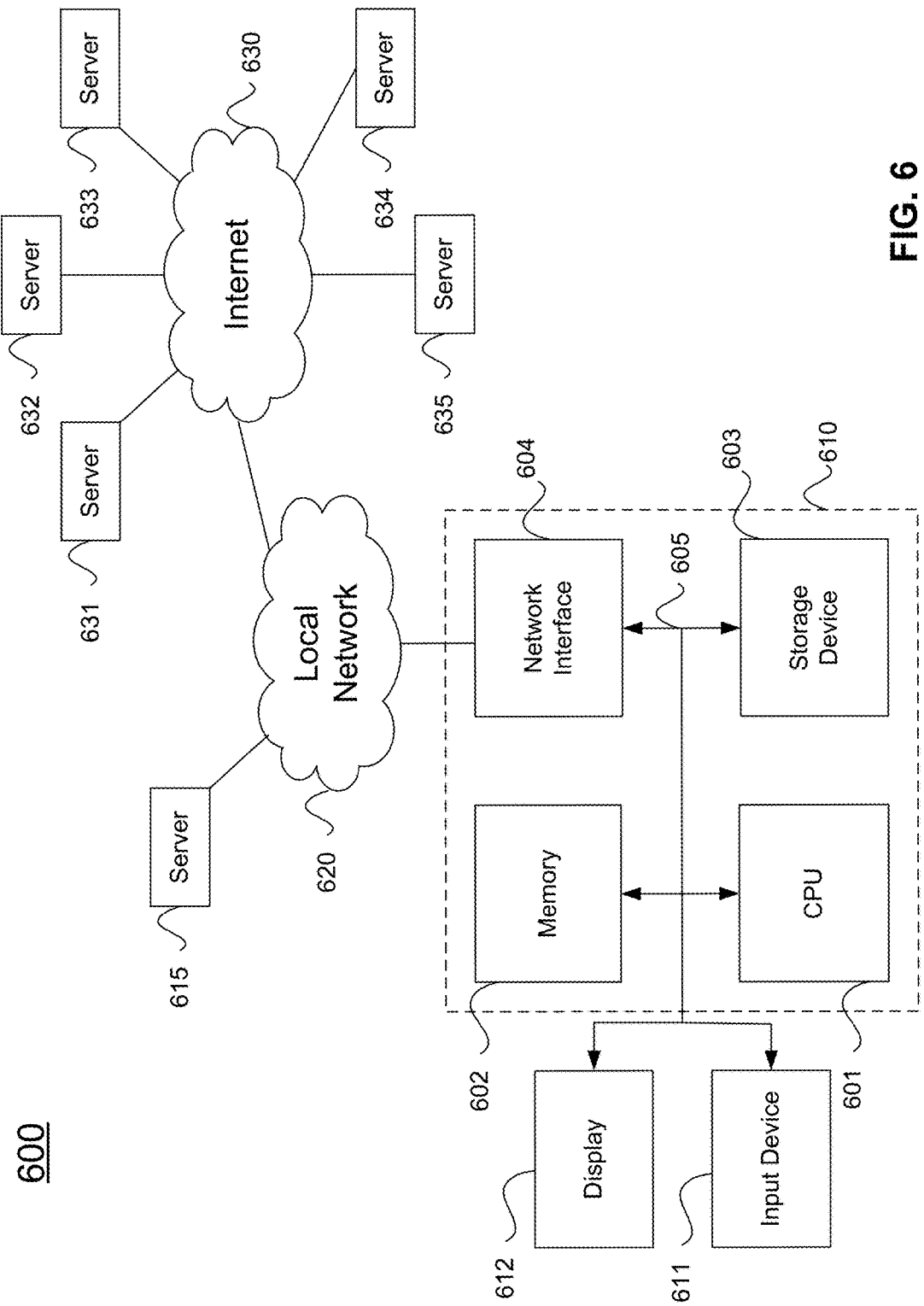
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
an in-memory database engine embodied in a local non-transitory computer readable storage medium, the in-memory database engine receiving data detected from a machine, wherein,
the machine produces products from a material;
the products are evaluated by a first inspection quality level including a first criterion,
the material is evaluated according to a second inspection quality level including a second criterion, and
the data comprises a condition or an event;
the in-memory database engine storing the data in an in-memory database embodied in the local non-transitory computer readable storage medium, the in-memory database further storing a production plan;
the in-memory database engine referencing a ruleset to assess the data and to output, a third inspection quality level including an updated first criterion, and a fourth inspection quality level including an updated second criterion, wherein the ruleset considers a number of complaints; and
the in-memory database engine storing in the in-memory database, the third inspection quality level and the fourth inspection quality level, wherein a rule of the ruleset rule dictates the third inspection quality level for a fixed period of time, automatically reverting to a less stringent inspection level thereafter.

2. The method as in claim 1 wherein the event comprises downtime of the machine.

3. The method as in claim 1 wherein the condition comprises an operational parameter.

4. The method as in claim 1 wherein the condition comprises a detected characteristic.

5. The method as in claim 1 wherein:
the first criterion comprises a first tolerance; and
the updated first criterion comprises a second tolerance more stringent than the first tolerance.

6. The method as in claim 1 wherein:
the first criterion comprises a first inspection lot size; and
the updated first criterion comprises a second inspection lot size larger than the first inspection lot size.

7. The method as in claim 1 wherein the updated first criterion comprises a time.

8. The method as in claim 1 wherein the engine is configured to further reference a production plan to output the third inspection quality level.

9. A non-transitory computer readable storage medium embodying a computer program for performing a method, said method comprising:

an in-memory database engine embodied locally in the non-transitory computer readable storage medium, the in-memory database engine receiving data detected from a machine, wherein,
  the machine produces products from a material,
  the products are evaluated according to a first inspection quality level including a first criterion,
  the material is evaluated according to a second inspection quality level according to a second criterion, and
  the data comprises a condition or an event;
the in-memory database engine storing the data in an in-memory database embodied in the local non-transitory computer readable storage medium, the in-memory database further storing a production plan;
the in-memory database engine referencing a ruleset to assess the data and output, a third inspection quality level including an updated first criterion, and a fourth inspection quality level including an updated second criterion, wherein the ruleset considers a number of complaints; and
the in-memory database engine storing in the in-memory database, the third inspection quality level and the fourth inspection quality level, wherein a rule of the ruleset rule dictates the third inspection quality level for a fixed period of time, automatically reverting to a less stringent inspection level thereafter.

10. The non-transitory computer readable storage medium as in claim 9 wherein the event comprises downtime of the machine.

11. The non-transitory computer readable storage medium as in claim 9 wherein the condition comprises an operational parameter.

12. The non-transitory computer readable storage medium as in claim 9 wherein the condition comprises a detected characteristic.

13. The non-transitory computer readable storage medium as in claim 9 wherein the updated first criterion comprises a time, an increased inspection lot size, an additional inspection step, or a more stringent tolerance.

14. The non-transitory computer readable storage medium as in claim 9 wherein the updated second criterion comprises a time, an increased inspection lot size, an additional inspection step, or a more stringent tolerance.

15. A computer system comprising:
  one or more processors;
  a software program, executable on said computer system, the software program configured to cause an in-memory database engine embodied in a local non-transitory computer readable storage medium to:
    receive data detected from a machine producing products from a material,
      the products evaluated according to a first inspection quality level including a first criterion,
      the material is evaluated according to a second inspection quality including a second criterion, and
      the data comprising a condition or an event;
    store the data in an in-memory database embodied in the local non-transitory computer readable storage medium, the in-memory database further storing a production plan;
    adopt a rule of a ruleset based upon past data collected from the machine;
    reference the rule and a production plan to assess the data and to output a third inspection quality level including an updated first criterion comprising a time, an increased inspection lot size, an additional inspection step, or a more stringent tolerance, and to output a fourth inspection quality level including an updated second criterion, wherein the ruleset considers a number of complaints; and
    store the third inspection quality level and the fourth inspection quality level in the in-memory database, wherein a rule of the ruleset rule dictates the third inspection quality level for a fixed period of time, automatically reverting to a less stringent inspection level thereafter.

16. The computer system as in claim 15 wherein the event comprises machine downtime.

17. The computer system as in claim 15 wherein the condition comprises an operational parameter or a detected characteristic.

* * * * *